(12) United States Patent
Ephraim et al.

(10) Patent No.: US 8,885,522 B2
(45) Date of Patent: *Nov. 11, 2014

(54) FLEXIBLE ALERTING FOR INTEGRATED CELLULAR AND VOIP

(71) Applicant: Cellco Partnership, Basking Ridge, NJ (US)

(72) Inventors: Robert M. Ephraim, Bridgewater, NJ (US); Ben-Ren Chen, Northborough, MA (US)

(73) Assignee: Cellco Partnership, Basking Ridge, NJ (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/774,897

(22) Filed: Feb. 22, 2013

(65) Prior Publication Data

US 2013/0201878 A1    Aug. 8, 2013

Related U.S. Application Data

(63) Continuation of application No. 12/240,597, filed on Sep. 29, 2008, now Pat. No. 8,385,232.

(51) Int. Cl.
| | |
|---|---|
| *H04L 12/16* | (2006.01) |
| *H04L 29/06* | (2006.01) |
| *H04M 7/00* | (2006.01) |
| *H04M 3/42* | (2006.01) |
| *H04M 3/46* | (2006.01) |
| *H04M 3/44* | (2006.01) |

(52) U.S. Cl.
CPC ........ *H04M 3/465* (2013.01); *H04M 2207/185* (2013.01); *H04M 2242/18* (2013.01); *H04M 3/44* (2013.01); *H04L 65/1069* (2013.01); *H04M 7/0069* (2013.01); *H04L 65/1036* (2013.01); *H04M 3/42246* (2013.01); *H04L 65/1006* (2013.01); *H04M 3/42042* (2013.01)
USPC .......................... 370/259; 370/310; 370/352

(58) Field of Classification Search
None
See application file for complete search history.

(56) References Cited

U.S. PATENT DOCUMENTS

| | | | |
|---|---|---|---|
| 6,456,706 | B1 | 9/2002 | Blood et al. |
| 7,068,668 | B2 | 6/2006 | Feuer |
| 7,277,735 | B1 | 10/2007 | Oh et al. |
| 2004/0180654 | A1* | 9/2004 | Chen ............................ 455/433 |
| 2004/0203576 | A1 | 10/2004 | Droste et al. |

(Continued)

OTHER PUBLICATIONS

"RingCentral User Guide", www.ringcentral.com, Jan. 7, 2007.*

(Continued)

*Primary Examiner* — Chirag Shah
*Assistant Examiner* — Jenkey Van

(57) ABSTRACT

An integrated cellular/Voice over IP (VoIP) telephone system including a flexible alerting system, which in response to an inbound call placed to a pilot telephone number, routes a first call leg to a cellular telephone assigned to the pilot telephone number and a second call leg to a telephone number. The telephone system includes a VoIP server configured to establish an inbound call to a VoIP client and establish an outbound call setting caller identification data corresponding to the pilot telephone number, responsive to an outbound call by the VoIP client. An outbound call from the VoIP client to the pilot telephone number is automatically routed to a voice mail system unless otherwise indicated. Based on an indication to not use a pilot telephone number for caller identification, an outbound call is established from the VoIP client to the cellular telephone, without being automatically directed to the voice mail system.

19 Claims, 3 Drawing Sheets

(56) References Cited

U.S. PATENT DOCUMENTS

2006/0072546 A1    4/2006   Chen
2007/0091878 A1*   4/2007   Croak et al. .................. 370/356
2007/0206568 A1*   9/2007   Silver et al. ................... 370/352

OTHER PUBLICATIONS

"Ring Central User Guide", www.ringcentral.com, Jan. 7, 2007.
Entire Prosecution of U.S. Appl. No. 12/240,597 to Ephraim et al. entitled "Flexible Alerting for Intergrated Cellular and VoIP".

* cited by examiner

FLEXIBLE ALERTING FOR INTEGRATED CELLULAR AND VOIP

RELATED APPLICATIONS AND CROSS REFERENCES

This application is a continuation of and claims the benefit of U.S. application Ser. No. 12/240,597, filed Sep. 29, 2008, titled "FLEXIBLE ALERTING FOR INTEGRATED CELLULAR AND VOIP," the disclosure of which is entirely incorporated herein by reference.

FIELD OF THE INVENTION

The present subject matter relates to techniques enabling transparent integration of cellular and VoIP telephone services.

BACKGROUND

As broadband IP connectivity to homes and offices has become more common, and the speeds of packet-switched communications equipment and the speed of processors have increased, a variety of applications have emerged that utilize IP packet transport as an alternative bearer for voice communications. Generally, such applications are referred to as voice-over-packet services, however, the common forms based on Internet Protocol (IP) are referred to as "Voice over IP" or "VoIP" services.

Additionally, cellular telephone services have grown in popularity. However, cellular telephone services are typically offered at a cost exceeding wireline VoIP telephone services. Thus, when a subscriber is at the home or office, the use of a wireline VoIP is preferred in order to reduce overall communications costs. However, without some degree of integration of the wireline VoIP and cellular services, a subscriber has two separate phone lines, phone numbers, and voice mail services. This presents inconvenience for those wishing to contact a subscriber, as they must be aware of and attempt to contact the subscriber at multiple telephone number. Further, having two independent services is an inconvenience for a subscriber, as multiple voice mail systems must be checked for messages. Additionally, for subscribers who are frequently away from the home or office, the cellular service often becomes a primary point of contact, thereby diminishing the benefit of wireline VoIP service in the home or office.

For the sake of convenience, various approaches to cellular/wireline VoIP integration schemes have been developed. These approaches rely on VoIP technology to provide the "glue" that integrates the cellular service with the wireline VoIP service. Such methods require all calls to or from a subscriber's cellular phone to be "anchored" at a control point in the IP network (e.g., a softswitch or feature server). One mechanism often employed involves the use of wireless intelligent network triggers. However, these triggers are often unavailable because they are already being used to provide the same subscribers with other services (e.g., call screening services, private dialing plans, etc.). Additionally, there are often restrictions on the use of certain triggers while roaming, making them unsuitable to use for call "anchoring."

Ultimately, none of the above approaches provide full service and feature transparency to the cellular phone subscriber. Specifically, these services fail to provide the subscriber with all of the following attributes, which together yield an enhanced level of cellular/wireline VoIP integration:

A single number that appears as caller identification data when the subscriber calls another party.

A single number used by other parties to call the subscriber, whereby both the subscriber's cellular phone and wireline VoIP would ring, with the incoming call completing to whichever phone (cellular or wireline VoIP) the subscriber chooses to use when answering.

An integrated voice mail box shared by the cellular and wireline VoIP services, and as readily accessible from the wireline VoIP service as from the cellular service.

If one of the phones is in use when the subscriber is alerted for another incoming call, the subscriber has the option of accepting the call from the idle phone, accepting the call from the phone in use as a call waiting call, or allowing the incoming call to be sent to the integrated voice mail box.

No loss of service transparency while roaming.

Maintain an existing cellular phone number, rather than require a new shared number.

Maintain other cellular features to which the subscriber has become accustomed.

Allow use of a third-party Internet Service Provider (ISP) for broadband access over which wireline VoIP service is delivered.

Reject calls directly placed to the wireline VoIP, so as to allow callers only a single telephone number for contacting the subscriber.

For calls made to a public safety answering point (PSAP), such as 911 calls in the United States, from a VoIP phone, provide caller identification data corresponding to the wireline VoIP phone, and allow subsequent PSAP-originated call back calls to be made.

BRIEF DESCRIPTION OF THE DRAWINGS

The drawing figures depict one or more implementations in accord with the present teachings, by way of example only, not by way of limitation. In the figures, like reference numerals refer to the same or similar element.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
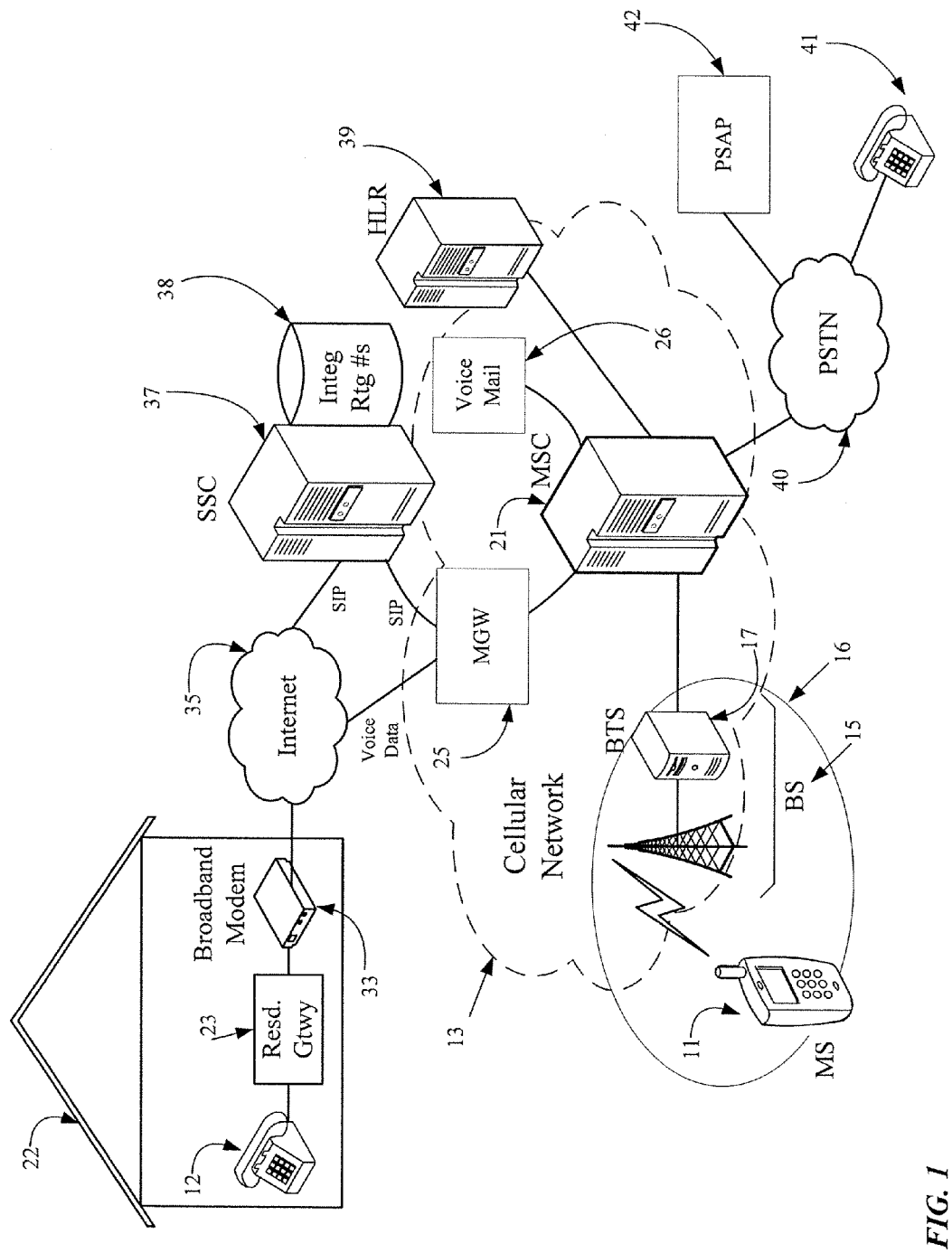
FIG. 1 provides a high-level illustration of an embodiment of a system that may offer an integrated service of the type discussed herein.

FIG. 1 provides a high-level illustration of an embodiment of a system that may offer an integrated service of the type discussed herein.

Mobile Station (MS) 11 represents a subscriber's cellular phone device. Currently mobile or wireless devices on active accounts with the wireless carrier are assigned one or more numbers for device authentication and related signaling purposes. Typically, a mobile station is assigned a mobile directory number (MDN) and a mobile identification number (MIN). The MDN is an actual telephone number. The MIN has a telephone number format but is typically a second number assigned to the device only for signaling purposes. At least the MIN and usually the MDN are programmed into the subscriber's mobile station, as part of the process of provisioning the device for operation through the wireless network. Association of those numbers with the subscriber and the subscriber's mobile station are also recorded in various databases used for service control, billing and the like in or otherwise associated with the wireless network. These numbers, particularly the MDNs, are resources available to the cellular service provider on a limited basis.

A Mobile Switching Center (MSC) 21 is responsible for handling voice calls as well as other services (such as SMS, conference calls, FAX, and circuit switched data) as a service delivery node and sets up and releases the end-to-end connection, handles mobility and hand-over requirements during the call and takes care of reporting call statistics for charging. The MSC 21 connects with a Public Switching Telephone Network (PSTN) 40. Calls routed through the MSC 21 are directed to other MSCs (not shown herein), to special service nodes (e.g., voice mail systems) or to external networks by way of PSTN 40. An MSC assigned to an MDN is the "Home MSC" for the MDN and the associated mobile station, although in some implementations a subscriber base may be distributed across a plurality of MSCs, any of which may function as a "Home MSC."

A base transceiver system (BTS) 17 included in a base station (BS) 15 assigns and reassigns channels to a mobile station 11 that it serves, and monitors the signal levels to recommend hand-offs to other base stations. The network typically includes a base station controller functionality (not illustrated) that controls the functions of a number of base stations and helps to manage how calls made by each mobile station are transferred (or handed-off) from one serving base station to another. Each wireless network equipment vender implements this function differently. Some vendors have a physical entity, which they call a BSC, while other vendors include this functionality as part of their MSC switch.

The MSC 21 supports a Flexible Alerting (FA) feature. FA is a standardized cellular feature that allows an MDN (i.e., a cellular phone number) to serve as the "pilot" number for a group of telephone numbers. A mix of cellular and non-cellular numbers is allowed. The cellular phone associated with the "pilot" MDN is referred to as the pilot of the group, and the phones (including the pilot) associated with the numbers in the group are referred to as an "FA group." When a call is placed to the "pilot" MDN, the Home MSC for the pilot of the group concurrently routes FA call legs to every available member of the FA group, and all of these phones are given an opportunity to answer the call. The Home MSC connects the caller to the first FA call leg to answer, or, if none of these legs answers, the Home MSC directs the call to voice mail system 26. The voice mailbox would be that associated with the pilot number.

Note that the above description of the handling of an incoming FA call merely describes processing under normal circumstances. However, the subscriber can choose to modify the handling of an incoming FA call by activating features such as Call Forward Unconditional or Call Forwarding No Answer.

Home Location Register (HLR) 39 is a database storing subscriber features and settings, and has a pointer telling which MSC 16 Mobile Station 11 is located in. As recognized in the art, an HLR stores for each mobile subscriber station the subscriber's mobile directory number (MDN), the MIN, and information specifying the wireless services subscribed to by the mobile subscriber, such as voice service features, SMS, etc. One aspect of normal HLR processing of an incoming voice or SMS call involves translation of the MDN associated with the call into the MIN, for use in completing the call to the mobile station 11. For each mobile station, the HLR also stores data identifying the current point of attachment of the mobile station to the network.

Typically, wireline VoIP services utilize packet switching for the switch fabric, and the call processing is implemented by SoftSwitch Complex (SSC) 37. The SSC 37 may be operated by the carrier or service provider operating the cellular network 13, or by a separate entity, generally under an agreement with that carrier/service provider to allow them to jointly offer the integrated service. The SSC 37 is typically provided through a combination of cooperating components that collectively provide necessary functions including database servers, service logic application servers, and security servers media resources (e.g., conference bridges, transcoders, announcement servers). Typically, a VoIP subscriber base will be distributed across a plurality of SSCs. SSC 37 may, but need not, conform to the architecture of the IP Multimedia Subsystem (IMS) which is the basis for much of the worldwide work to develop standards for "next generation" telecommunications systems. Most current VoIP SSC implementations rely on the Session Initiation Protocol (SIP) for the signaling to set-up calls for voice and other multimedia sessions, as standardized by the IETF. Although present integrated service is not dependent upon any specific VoIP protocol, exemplary embodiments will be discussed with respect to SIP.

A set of phone numbers is assigned to a VoIP service provider, with the phone numbers "homed" to SSC 37, for use as "integration routing numbers" 38, as to be detailed below. The phone numbers may come from "Office Codes" officially assigned to SSC 37 through the normal Numbering Administration process, pooled blocks assigned to SSC 37, "ported" to SSC 37, or otherwise.

A Media Gateway (MGW) 25 provides an interface between the circuit-based cellular network, which includes MSC 21, and the IP-based VoIP network, which includes SSC 37. MGW 25 supports SIP-I (also known as SIP-T) (in accordance with Profile C as described in ITU recommendation Q.1912.5-2004) for interworking between ISUP and SIP. Typically, a plurality of geographically dispersed MGWs is used by a cellular network 13.

VoIP data is exchanged with a subscriber installation via Internet 35, which is typically delivered to a subscriber endpoint 22, such as a home or office, by an Internet Service Provider (ISP). The ISP may be a carrier or service provider other than the cellular service provider. At the subscriber endpoint 22, network access is typically provided via a broadband modem 33, which may be, for example, a cable modem or a digital subscriber line (DSL) modem, a data device for communication over fiber, a wireless network, or any other type of IP network capable of multimedia session communications. The present concepts also encompass arrangements that utilize wireless or fiber transport for IP packet services. Through broadband modem 33, a subscriber is provided with two-way IP packet communication, suitable for wireline VoIP service.

The subscriber is provided with a Residential Gateway 23 for wireline VoIP service. The Residential Gateway 23 connects to the subscriber's broadband service, whether directly to broadband modem 33 or indirectly, such as through an intermediate home router (not shown) connected to the broadband modem 33. Residential Gateway 23 supports a VoIP client, and typically provides one or more standard telephone adapter interfaces (with corresponding female RJ-11 connectors) so that the subscriber can connect ordinary corded or cordless phones 12 to the Residential Gateway 23. The VoIP client supported by the Residential Gateway 23 allows a subscriber to use phone 12 to originate or receive VoIP calls and invoke VoIP features. Typically, a Residential Gateway 23 provides an internal configuration webpage, accessible with a personal computer (not shown) to allow a subscriber to customize the operation of the Residential Gateway 23.

The VoIP client supported by the Residential Gateway 23 is provisioned with, or uses a discovery protocol such as DNS to learn, the address of SSC 37, and the VoIP client authenticates and registers with SSC 37, by way of an SIP REGISTER message, to inform the SSC 37 of the "contact address" for the subscriber. As noted above, in this particular disclosed embodiment, SIP is employed between SSC 37 and the VoIP client. SIP is a signaling protocol for Internet conferencing, telephony, presence, events notification, instant messaging, and the like. SIP uses a long-term stable identifier, the SIP Uniform Resource Identifier (URI) and the SIP URI scheme as presented in RFC 3261. SIP protocol is employed to initiate and to modify a multimedia session over the internet protocol (IP) network. SIP can be regarded as the enabler protocol for VoIP services.

SIP is a text-based protocol and uses the UTF-8 character set. A SIP message is either a request from a client to a server, or a response from a server to a client. Basic formats of both request and response messages are presented in RFC 2822. The Session Initiation Protocol (SIP) as described in RFC 3261 may be used as a VoIP signaling protocol. The VoIP clients are also referred to as "SIP clients." As noted previously, the use of SIP is merely exemplary, and the VoIP client may use another VoIP telephony protocol.

In an example, the above network resources can be employed to provide a subscriber with an integrated cellular/wireline VoIP service by:

Uniquely assigning one of the "integration routing numbers" 38 to the subscriber.
Creating an FA group containing the subscriber's MDN as a pilot number, and having the uniquely assigned "integration routing number" as another member of the FA group.
Providing the subscriber with a Residential Gateway for installation,
Provisioning a record for the subscriber in the SSC containing relevant subscriber-specific information, such as the subscriber's MDN, the assigned "integration routing number," and information corresponding to the Residential Gateway.

Then, SSC 37 operates, as detailed below, to employ the above features to provide an integrated cellular/wireline VoIP service.

When the SSC 37 receives an SIP INVITE initiating a new outbound call from the VoIP client, and the invite is addressed to a number (or to a SIP-URI or Tel-URI associated with the number), the SSC 37 acts as a Back-to-Back User Agent for the call, and extends a new call leg to toward the called number. The caller identification data (e.g., Caller ID) for this new call leg includes the MDN of the subscriber's cellular phone. This allows calls placed from the subscriber's wireline VoIP phone 12 to other parties to be indistinguishable from calls placed from the subscriber's cellular phone. For all normal purposes, the subscriber is seen as having a single number, the subscriber's MDN; the subscriber's "integration routing number" is, in normal circumstances, invisible to third parties When SSC 37 receives an SIP INVITE for a new inbound call and the INVITE is addressed to a subscriber's "integration routing number" (or an associated SIP-URI or Tel-URI), SSC 37 examines information received in the INVITE for an encapsulated ISUP IAM. If the ISUP IAM is present, SSC 37 examines the ISUP Calling Party Number, Original Called Number, and Redirecting Number parameters contained therein, if available, to determine whether SSC 37 will either 1) reject the call, or 2) act as a Back-to-Back User Agent for the call and extend a new call leg toward the subscriber's Residential Gateway 23, in which case the subscriber's wireline VoIP phone 12 can be used to answer the call.

More specifically, SSC 37 will normally reject the call if the INVITE does not contain an encapsulated IAM. Further, SSC 37 will normally reject a call unless the ISUP Calling Party Number, Original Called Number, and Redirecting Number parameters are populated in a manner that indicates that the inbound call either 1) originated from the subscriber's cellular phone 11, or 2) began as a call to the FA group piloted by the subscriber's MDN. However, the SSC 37 will extend a new call leg toward the subscriber's Residential Gateway 23 allowing it to be answered by the subscriber's wireline VoIP phone 12 if the inbound call 1) originated from the subscriber's cellular phone 11, or 2) is a call leg resulting from a call to the FA group having the subscriber's MDN as pilot number.

For all normal purposes, the subscriber would be seen by others as having a single number, the subscriber's MDN, which would be used as caller ID when the subscriber called them and that they would use to place a call to the subscriber. Outside callers would be unaware of which phone the subscriber used to answer their call, or even of the fact that the subscriber has both a cellular phone 11 and a wireline VoIP phone 12. A subscriber would be call the subscriber's own wireline VoIP phone 12 from the subscriber's own cellular phones 11 by calling the subscriber's own "wireline integration number". But the subscriber's "integration routing number" would, in normal circumstances, be invisible to third parties; deliberate or accidental attempts by a caller to place a call directly to the wireline VoIP phone 12 by calling the "integration routing number" would be rejected (although, as will be discussed below, a limited exception may be made for call back calls associated to emergency calls).

As mentioned above, the integration described above also extends to voice mail services. As part of the normal handling of the FA feature by MSC 21 and HLR 39 controlling FA for the subscriber's FA group, if a call is not answered by a member of the FA group (i.e., subscriber's cellular phone 11 or wireline VoIP phone 12), MSC 21 will redirect the call to the subscriber's cellular voice mail system 26. Moreover, the MSC 21 and HLR 39 will recognize (or can be configured or upgraded to recognize) a call to the pilot MDN from the subscriber's cell phone 11 as a call that should be immediately routed to the subscriber's voice mail system 26. The subscriber's cellular phone 11 will work normally, retrieving voice mail messages by placing a call to its own MDN. Additionally, SSC 37, MSC 21, and HLR 39 will operate together so as to provide similar accessibility to cellular voice mail system 26 from the wireline VoIP phone 12. Since the SSC 37 includes the MDN belonging to the cell phone 11 as the caller identification data for calls placed from the wireline VoIP phone 12, just as that MDN is used as caller identification for calls originating from the cellular phone 11, MSC 21 and HLR 39 will not be able to distinguish between calls placed from the wireline VoIP phone 12 to the MDN and calls placed by the cell phone 11 to the MDN. Consequently, a call placed from the wireline VoIP phone 12 to the pilot MDN will be immediately routed to the subscriber's voice mail system 26, just as if the call had been placed from subscriber's cellular phone 11. The voice mail system 26 will also be unable to distinguish between such calls placed from the subscriber's wireline VoIP phone 12 and such calls placed from the subscriber's cellular phone 11, thereby providing ready voice mail access to the subscriber's voicemail box in retrieval mode.

A service provider may choose to provide selected exceptions to the general use of the subscriber's MDN as caller identification data for calls placed from the wireline VoIP phone 12 as described above. For example, the subscriber may wish to place a call from wireline VoIP phone 12 to Mobile Station 11 without the call being automatically directed to voice mail system 26 for voice mail retrieval, as just described. To permit this, the SSC 37 may be configured to recognize special dialing strings or dialing prefixes as a subscriber request not to use the subscriber's MDN in caller identification data. In such exceptional circumstances, SSC 37 may omit caller identification data, or instead include the "integration routing number" in the caller identification data.

A service provider may also choose to provide an exception to the general use of the subscriber's MDN as caller identification data for calls placed from the wireline VoIP phone 12 for emergency calls from the wireline VoIP phone 12 to public safety answering points (PSAPs), such as 911 calls in the US. If the MDN were provided as caller identification data for an emergency call, a call back call from the PSAP to the subscriber might be answered by the cell phone, and never reach the caller who placed the emergency call from the wireline VoIP phone 12. To prevent this from happening, the service provider might configure the SSC 37 to use the subscriber's "routing integration number" as caller identification data for emergency calls from the subscriber's wireline VoIP phone 12. However, if the PSAP were to place a call back call to the subscriber's "roaming integration number," that call would normally be blocked by the SSC 37 since the call signaling does not indicate to the SSC 37 that the incoming call is a call from an emergency service responder attempting to place a call back call for an emergency call previously placed by the wireline VoIP phone 12. To ensure that a call back call from a PSAP can reach the subscriber's wireline VoIP phone 12, if the service provider configures the SSC 37 to use the subscriber's "integration routing number" as caller identification data for emergency calls placed from the subscriber's wireline VoIP phone 12, the service provider should also configure the SCC 37 to temporarily suspend incoming call screening for calls to the subscriber's wireline VoIP phone 12 for a period of time following the end of an emergency call placed from the subscriber's wireline VOIP phone 12

Call Processing Examples:
A) Incoming Call from PSTN to Pilot Number
1) Phone 41 places call via PSTN 40 to the MDN. This call is routed to MSC 21.
2) Home MSC 21 for MS 11, which manages the FA Group, extends call legs to MS 11 and the integration routing number assigned to VoIP client 23.
3a) In response to the call leg to MS 11, MS 11 rings, indicating an incoming call
3b) The call leg to the integration routing number is routed to MGW 25. MGW 25 sends a SIP INVITE to SSC 37. Via Internet 35, SSC 37 sends a SIP INVITE to VoIP Client 23. VoIP client 23 rings phone 12, indicating an incoming call.
4) Both MS 11 and phone 12 ring in response to the incoming call to the pilot number.
5) If the customer takes the call at either MS 11 or phone 12, the connection is completed to the phone that took the call, and the other call leg is terminated.
6) If the call is not taken at either phone, MSC 21 terminates the two call legs and extends a new call leg to voice mail 26 associated with MS 11, which handles the incoming call in the conventional manner.

Figure 2:
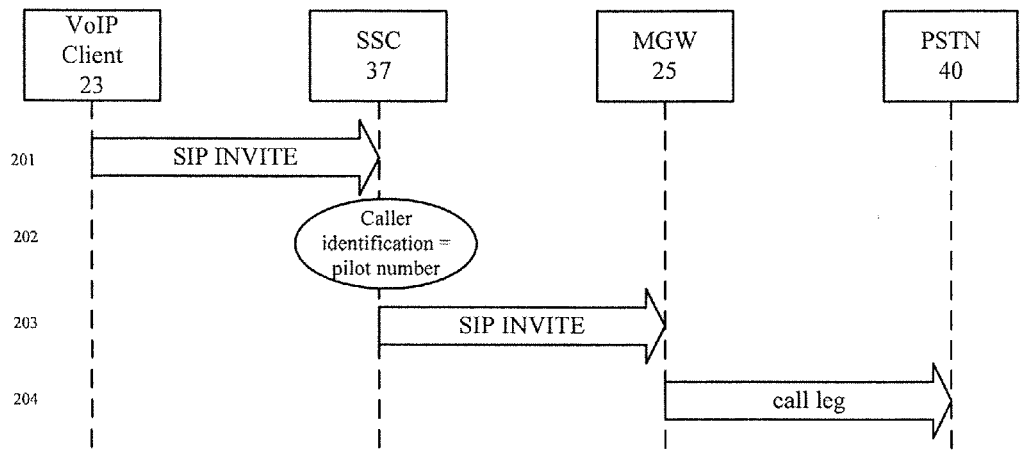
FIG. 2 provides a high-level illustration of operations performed in placing a call from a VoIP client to a phone on a PSTN.

B) Outbound Call from VoIP Client to Phone on PSTN (see FIG. 2)
1) On phone 12, customer dials number for phone 41, which is accessible via PSTN 40. Attached VoIP client 23 sends a SIP INVITE to SSC 37 via Internet 35 (step 201).
2) SSC 37 sends a SIP INVITE to a MGW, such as MGW 25 (step 203). Call origination data for the call leg is set to indicate that the call originated from the MDN, rather than the integration routing number assigned to VoIP client 23 (step 202).
3) The MGW extends a call leg, via PSTN 40, to phone 41 (step 204).

C) Call from Mobile Station to VoIP Client
1) Call is placed from MS 11 to the integration routing number assigned to VoIP client 23.
2) The call is routed to MGW 25, which sends a SIP INVITE to SSC 37.
3) SSC 37, which ordinarily would not accept a call made directly to the integration routing number, recognizes that the call originated from MS 11 associated with the pilot number for the FA Group. SSC 37 sends a SIP INVITE to VoIP client 23.
4) VoIP client 23 receives the SIP INVITE, and rings phone 12, at which the call placed from MS 11 can be received.

Figure 3:
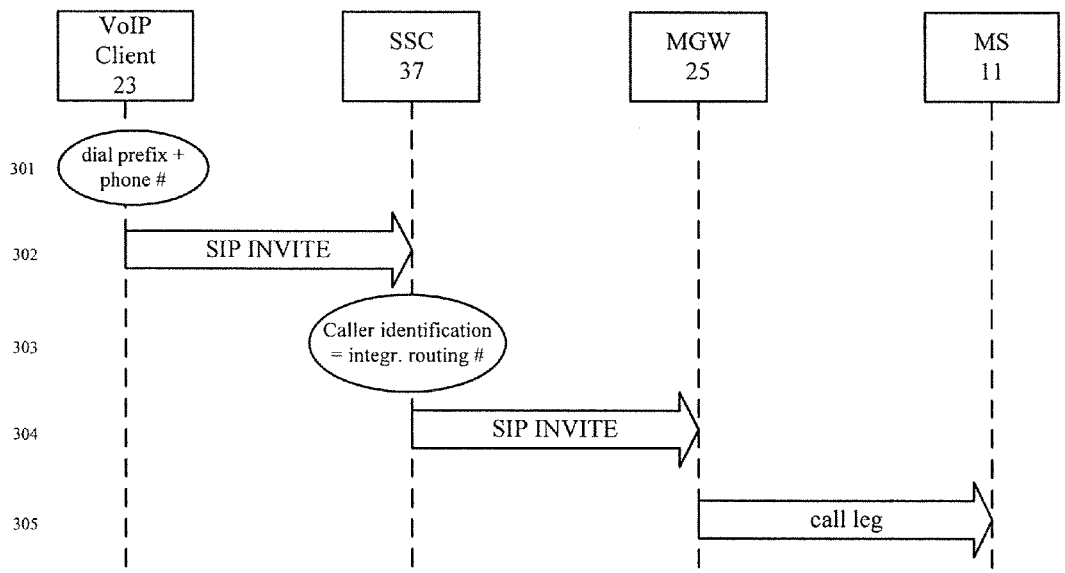
FIG. 3 provides a high-level illustration of operations performed in placing a call from a VoIP client to its related mobile station.

D) Call from VoIP Client to Mobile Station (see FIG. 3)
1) On phone 12, customer dials a string of digits to indicate that the outbound call is not to use the pilot number as caller identification data. This string of digits is followed by the number for MS 11 (i.e., the FA Group pilot number) (step 301). Attached VoIP Client 23 sends an SIP invite to SSC 37 via Internet 35 (step 302).
2) SSC 37 extends a call leg to MS 11 (step 304). Call origination data is set to indicate the integration routing number as where the call originated from, rather than using the MDN (step 303). Thus, when MS 11 receives the call, it will be apparent that the call originated at the customer's residential phone 12.
3) The call leg is routed to MS 11 (step 305).

Figure 4:
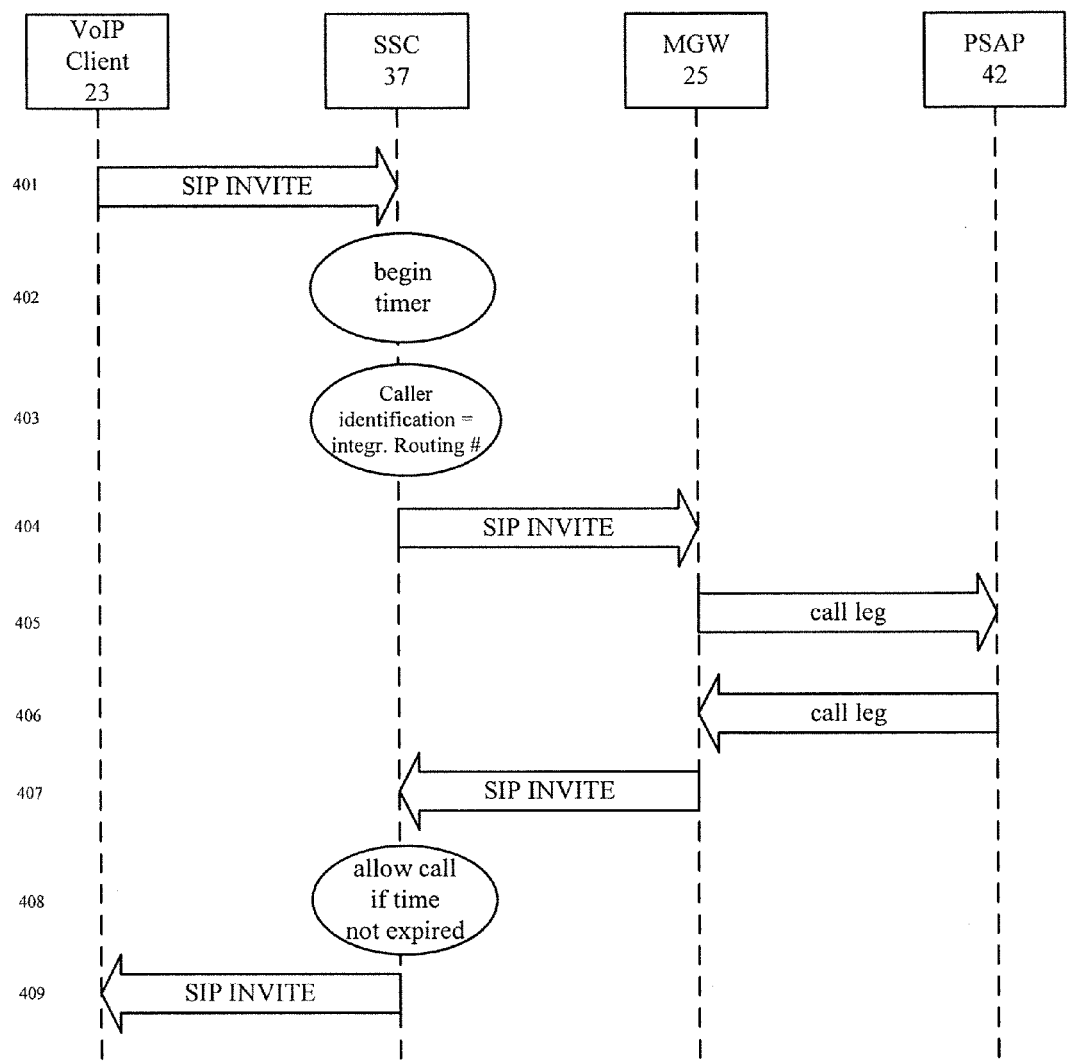
FIG. 4 provides a high-level illustration of operations performed in placing a call from a VoIP client to a public safety answering point, and the reverse.

D) Emergency services call from VoIP Client (see FIG. 4)
1) On phone 12, customer dials an emergency services call (e.g., a 911 call in the US) and phone 12 sends a SIP INVITE via the Internet to the SSC 37 (step 401).
2) SCC 37 recognizes the call as an emergency call; starts an incoming call screening suspension timer (step 402); sets the caller identification for the call to the subscriber's integration routing number (step 403); and extends a call leg (step 404).
3) The call leg is routed to the PSAP (step 405).
4) The PSAP initiates a call back call to the subscriber's integration routing number (step 406)
5) The SSC 37 receives the incoming SIP INVITE for the call back call (step 407).
6) If the incoming call screening suspension timer is still running (step 408), the SSC 37 forwards a call leg toward the phone 12 (step 409).

Aspects of the methods outlined above may be embodied in programming, e.g. in the form of software, firmware, or microcode executable by a server or other programmable device. Such programming typically is carried on or otherwise embodied in a medium or media. Terms such as "machine-readable" medium and "computer-readable" medium as used herein generically refer to any tangible medium that participates in providing instructions and/or data to a programmable processor, such as the CPU or other processor of a server computer or user terminal device, for execution or other processing, including both storage media and communication media. A medium may take many forms, including but not limited to, non-volatile storage media and volatile storage media. Non-volatile storage media include, for example, optical or magnetic disks and flash memory. Volatile storage media include dynamic memory, such as main memory or cache. Hence, common forms of machine-readable storage media include, for example, a floppy disk, a flexible disk, a hard disk, a magnetic tape, any other magnetic medium, a CD or CDROM, a DVD or DVD-ROM, any other optical medium, punch cards, paper tape, any other physical medium with patterns of holes, a RAM, a PROM, an EPROM, an EEPROM, a FLASH-EPROM, a cache memory, or any other memory chip or cartridge.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An article of manufacture, comprising a non-transitory computer-readable medium and computer-executable instructions embodied in the medium that, if executed by a processor, cause the processor to perform functions, including functions to:
   in response to an inbound call received on a cellular communication network and placed to a pilot telephone number identifying a first group of telephone numbers of a plurality of groups of telephone numbers, initiate a first inbound call leg to a cellular telephone to which the pilot telephone number is assigned and a second inbound call leg to a-telephone number associated with a Voice over Internet Protocol (VoIP) client,
   wherein:
      the pilot telephone number is a mobile directory number of the cellular telephone, and
      the first group of telephone numbers includes at least the pilot telephone number and the telephone number associated with the VoIP client;
   automatically route to a voice mail system for voice mail retrieval a first outbound call to the pilot telephone number for the cellular telephone from the VoIP client using the telephone number associated with the VoIP client belonging to the first group of telephone numbers; and
   establish a second outbound call from the VoIP client using the telephone number associated with the VoIP client to the pilot telephone number for the cellular telephone, without the second outbound call being automatically directed to the voice mail system, in response to input of a special dial string at the VoIP client.

2. The article of manufacture of claim 1, wherein the functions further include a function to establish an outbound call with caller identification data set to correspond to the mobile directory number in response to an outbound call originated by the VoIP client so that the outbound call originated by the VoIP client appears as an outbound call by the mobile directory number.

3. The article of manufacture of claim 1, wherein the functions further include a function to establish an inbound call to the VoIP client via the second inbound call leg to the telephone number associated with the VoIP client.

4. The article of manufacture of claim 1, wherein the functions further include a function to establish an outbound call leg with caller identification data set to correspond to the pilot telephone number in response to an outbound call originated by the cellular telephone.

5. The article of manufacture of claim 1, wherein the functions further include a function to establish an inbound call to the VoIP client in response to an inbound call placed to the telephone number associated with the VoIP client from the cellular telephone.

6. The article of manufacture of claim 1, wherein the functions further include a function to refuse to establish an inbound call to the VoIP client if the inbound call lacks caller identification data.

7. The article of manufacture of claim 1, wherein the functions further include a function to refuse to establish an inbound call to the VoIP client in response to an inbound call placed to the telephone number associated with the VoIP client if the inbound call has caller identification data indicating that the inbound call was neither:
   a call routed to the telephone number by a flexible alerting system, nor
   a call placed to the telephone number from the cellular telephone.

8. The article of manufacture of claim 1, wherein the special dial string at the VoIP client is not related to a calling feature for voice mail retrieval.

9. The article of manufacture of claim 1, wherein a particular outbound call originated by the VoIP client is established with caller identification data set to correspond to the mobile directory number of the cellular telephone so that the particular outbound call originated by the VoIP client appears as an outbound call by the mobile directory number of the cellular telephone unless the special dial string is used at the VoIP client.

10. The article of manufacture of claim 1, wherein the functions further include a function to establish a particular outbound call originated by the VoIP client with caller identification data set to correspond to the telephone number associated with the VoIP client, when the particular outbound call is an emergency call placed by the VoIP client.

11. The article of manufacture of claim 7, wherein the functions further include a function to suspend refusing to establish an inbound call to the VoIP client for a period of time following the end of an emergency call placed by the VoIP client.

12. A system comprising:
   a Voice over Internet Protocol (VoIP) server configured to establish an inbound call to a VoIP client; and
   a mobile switching center of a cellular communication network, configured to route a first inbound call leg to a mobile directory number of a cellular telephone and a second inbound call leg to a telephone number associated with the VoIP client via the VoIP server,
   wherein:
      the mobile directory number of a cellular telephone is a pilot telephone number identifying a first group of telephone numbers of a plurality of groups of telephone numbers,
      the first group includes at least the pilot telephone number and the telephone number associated with the VoIP client; and
      the VoIP server is further configured to:

automatically route to a voice mail system for voice mail retrieval a first outbound call from the VoIP client using the telephone number associated with the VoIP client to the pilot telephone number; and establish a second outbound call from the VoIP client using the telephone number associated with the VoIP client to the pilot telephone number, without the second outbound call automatically directed to the voice mail system, in response to an input at the VoIP client.

13. The system of claim 12, wherein the VoIP server is further configured to:

establish an inbound call to the VoIP client in response to the second inbound call leg routed to the telephone number associated with the VoIP client; and establish an outbound call with caller identification data set to correspond to the pilot telephone number in response to an outbound call originated by the VoIP client so that the outbound call originated by the VoIP client appears as an outbound call by the cellular telephone.

14. The system of claim 12, wherein the VoIP server is further configured to refuse to establish an inbound call to the VoIP client if the inbound call lacks caller identification data.

15. The system of claim 12, wherein the VoIP server is further configured to refuse to establish an inbound call to the VoIP client in response to an inbound call placed to the telephone number associated with the VoIP client, if the inbound call has caller identification data indicating that the inbound call was neither:

a call routed to the telephone number by the mobile switching center, nor a call placed to the telephone number from the cellular telephone.

16. The system of claim 15, wherein the VoIP server is further configured to suspend refusing to establish an inbound call to the VoIP client for a period of time following the end of an emergency call placed by the VoIP client.

17. The system of claim 12, wherein the input at the VoIP client is not related to a calling feature for voice mail retrieval.

18. The system of claim 12, wherein a particular outbound call originated by the VoIP client is established with caller identification data set to correspond to the mobile directory number of the cellular telephone so that the particular outbound call originated by the VoIP client appears as an outbound call by the mobile directory number of the cellular telephone unless the input indicates to not use the mobile directory number as the caller identification.

19. The system of claim 12, wherein a particular outbound call originated by the VoIP client is established with caller identification data set to correspond to the telephone number associated with the VoIP client, when the particular outbound call is an emergency call placed by the VoIP client.

* * * * *